United States Patent
Mortsolf et al.

(10) Patent No.: US 9,807,157 B2
(45) Date of Patent: Oct. 31, 2017

(54) HYBRID VIRTUAL LOAD BALANCER

(71) Applicant: rift.IO, Inc., Burlington, MA (US)

(72) Inventors: Timothy G. Mortsolf, Amherst, MA (US); Matthew H. Harper, Hollis, NH (US); Gregory Alden, Arnold, MD (US); Aniruddha Atale, Nashua, NH (US); Anil Gunturu, Lexington, MA (US)

(73) Assignee: rift.IO, Inc., Burlington, MA (US)

( * ) Notice: Subject to any disclaimer, the term of this patent is extended or adjusted under 35 U.S.C. 154(b) by 221 days.

(21) Appl. No.: 14/926,686

(22) Filed: Oct. 29, 2015

(65) Prior Publication Data

US 2017/0126790 A1    May 4, 2017

(51) Int. Cl.

| | |
|---|---|
| *G06F 15/173* | (2006.01) |
| *H04L 29/08* | (2006.01) |
| *G06F 9/455* | (2006.01) |
| *H04L 12/64* | (2006.01) |
| *G06F 9/50* | (2006.01) |
| *H04L 12/801* | (2013.01) |
| *H04L 12/721* | (2013.01) |
| *H04L 12/715* | (2013.01) |

(52) U.S. Cl.
CPC ...... *H04L 67/1002* (2013.01); *G06F 9/45558* (2013.01); *G06F 9/5083* (2013.01); *H04L 12/64* (2013.01); *H04L 45/38* (2013.01); *H04L 47/10* (2013.01); *H04L 67/101* (2013.01); *H04L 67/1008* (2013.01); *G06F 2009/4557* (2013.01); *G06F 2009/45595* (2013.01); *H04L 45/64* (2013.01); *H04L 67/10* (2013.01)

(58) Field of Classification Search
CPC .............. H04L 12/64; H04L 29/08144; H04L 29/08297; H04L 29/08738; H04L 45/00; H04L 47/10; H04L 47/12–47/125; G06F 9/5083

See application file for complete search history.

(56) References Cited

U.S. PATENT DOCUMENTS

| | | | |
|---|---|---|---|
| 2014/0269288 A1* | 9/2014 | Crisan | H04L 47/2425 370/231 |
| 2016/0191545 A1* | 6/2016 | Nanda | H04L 43/062 726/1 |
| 2017/0013049 A1* | 1/2017 | Patil | H04L 67/1002 |

* cited by examiner

*Primary Examiner* — Brendan Higa
(74) *Attorney, Agent, or Firm* — Sterne, Kessler, Goldstein & Fox P.L.L.C.

(57) ABSTRACT

Disclosed herein are system, method, and computer program product embodiments for performing load balancing of a data packet received by a hybrid virtual load balancer. An embodiment operates by detecting a hardware capability of a switch. The hybrid virtual load balancer may also receive policy code from a user specifying a desired load balancing behavior for the data packet. Based on the hardware capability and the policy code, the hybrid virtual load balancer may determine whether to offload load balancing of the data packet to the switch or process the data packet in software on the hybrid virtual load balancer. If the load balancing is to be offloaded, the hybrid virtual load balancer may send programming instructions to an SDN controller coupled to the switch. The programming instructions direct the SDN controller to program the switch to load balance the data packet.

20 Claims, 9 Drawing Sheets

HYBRID VIRTUAL LOAD BALANCER

BACKGROUND

Load balancers are commonly used to distribute network traffic across multiple processing entities. Load balancers can be appliance-based and are traditionally developed using custom or purpose-built proprietary networking hardware (e.g. NPUs, ASICs, TCAMs, FPGAs, etc.). As the technology evolves and network and back-office functions are migrated over to the cloud, load balancers implemented as hardware appliances are exceedingly difficult and costly to scale. Although software based load balancers exist too, they typically do not enable performance comparable to hardware appliance implementations. Additionally, a load balancer may need to operate in a transparent mode where the load balancing functions are performed transparently or invisibly to clients and servers in the network. For example, when operating in the transparent mode, the load balancer may intercept network traffic at the network layer and source addresses in the traffic are not modified when the load balancer routes the traffic to a processing entity. Systems and methods are needed to implement a cloud based, hybrid virtual load balancer that may be deployed transparently.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for utilizing a hybrid virtual load balancer (HVLB) in conjunction with a hardware switch to load balance network data traffic. For example, embodiments may enable the HVLB to aid in programming a plurality of switches to process and load balance network traffic at the switches based on respective hardware capabilities of the switches. In an embodiment, the HVLB may also be configured as a softswitch to load balance the network data traffic itself. Therefore, in an embodiment, the HVLB may load balance data traffic in software or offload the load balancing to be performed in hardware of the switches. In an embodiment, the HVLB may be configured to receive policy code from users to determine how to perform load balancing and whether to load balance data packets in software or offload the processing to the switches. The hybrid nature of the HVLB retains the high performance load balancing traditionally performed at the switches and introduces further flexibility and scalability enabled by software of the HVLB.

Figure 1:
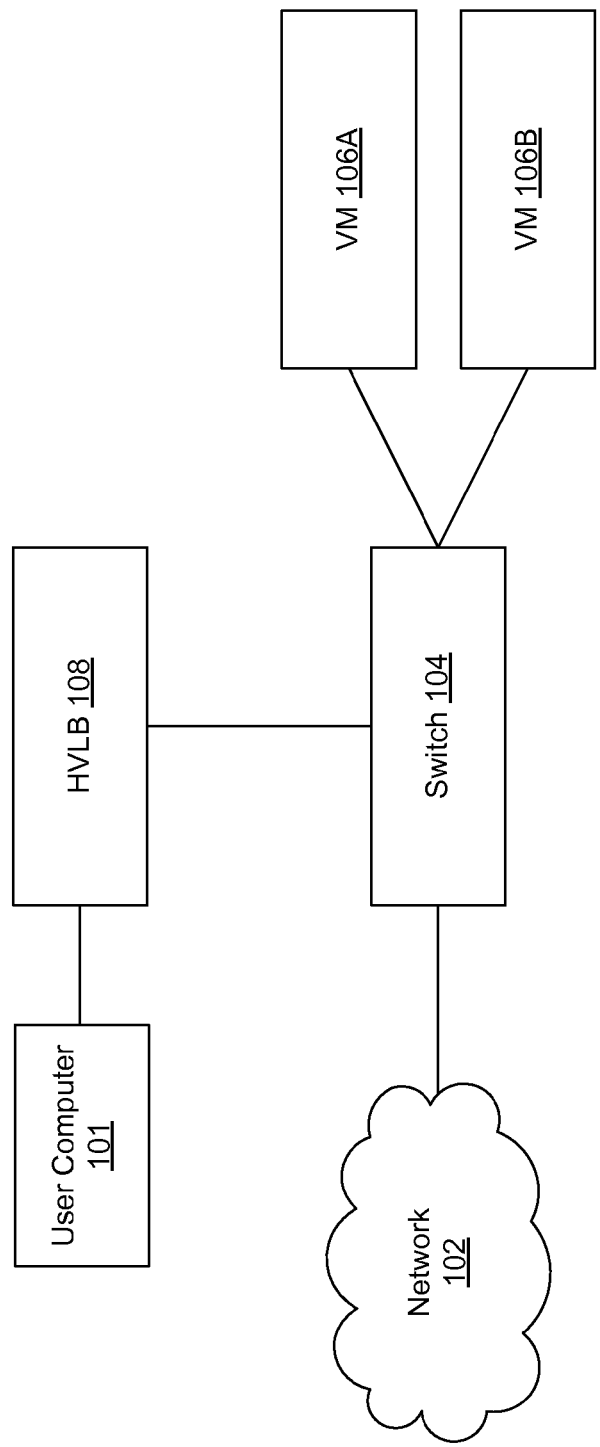
FIG. 1 is an example block diagram illustrating a network architecture system implementing a hybrid virtual load balancer, according to an example embodiment.

FIG. 1 illustrates a network architecture system 100 implementing a virtual load balancer, according to an example embodiment. Network architecture system 100 includes user computer 101, network 102, switch 104, virtual machines (VMs) 106, and hybrid virtual load balancer (HVLB) 108. In an embodiment, switch 104 may be connected to network 102. Network 102 may be representative of a local area network (LAN), metropolitan area network (MAN), or wide area network (WAN), or any point-to-point or multipoint-to-multipoint networking protocols. Other wired and/or wireless communication techniques, protocols, and technologies may similarly be used. In an embodiment, switch 104 may be connected to one or more clients, servers, virtual machines, routers, or switches instead of network 102.

User computer 101 may be coupled to HVLB 108 and is representative of one or more computers operated by one or more users to control the configuration and load processing processes within network architecture system 100. A user may send policy code from user computer 101 to HVLB 108, as further described below. In an embodiment, user computer 101 may be a virtual machine or remote server operated by a user.

Switch 104 may be a hardware-based computer network device that may be configured to receive a data packet from the network data traffic of network 102. In an embodiment, switch 104 may be an OSI layer 2 switch. In an embodiment, switch 104 may be a multilayer switch that is capable of switching on Open Systems Interconnection (OSI) layer 2 and one or more higher OSI layers. For example, switch 104 may inspect and switch based on OSI layer 3 or 4 information. A layer 3/4 switch 104 may also support functions such as network address translation (NAT) used to modify IP headers of data packets. In top-of-rack switching architecture, switch 104 may be an in-rack switch that is coupled to the servers within a rack. In an embodiment, switch 104 may be a software programmable switch and software defined networking (SDN) compatible. In such a case, the control plane of switch 104 may be decoupled from switch 104 and configured outside of switch 104.

In an embodiment, VMs 106 may be virtual machines configured by one or more servers. The servers may be database, application, and/or web servers implemented using, for example, commercial off-the-shelf (COTS) servers. In an embodiment, VM 106 may be representative of virtual machine appliances running on appliance hardware or within virtual machine containers. In top-of-rack architectures, VMs 106 may be servers in a rack and/or virtual machines running on those servers.

In an embodiment, HVLB 108 may be cloud-based software used to distribute the load received at switch 104 from network 102 across a plurality of VMs 106. The HVLB 108 may be implemented on commercial off-the-shelf (COTS) servers and/or processors. In an embodiment HVLB 108 may be representative of a distributed network of HVLBs that may appear to a user operating user computer 101 as a single load balancer. HVLB 108 may load balance traffic flows on one or more OSI layers. HVLB 108 may also perform the load balancing transparently.

Data packets received by switch 104 may flow to HVLB 108. Software within HVLB 108 may be configured by policy code received from user computer 101 to load balance data traffic based on information associated with one or more of the OSI layers contained in received data packets. In accordance with the load balancing decision, HVLB 108 may forward the data packet to one of VM 106 via switch 104. For example, HVLB 108 may load balance on OSI layer 7 or the high-level application layer by selecting one of VM 106 based on contents within the data packet.

Figure 2:
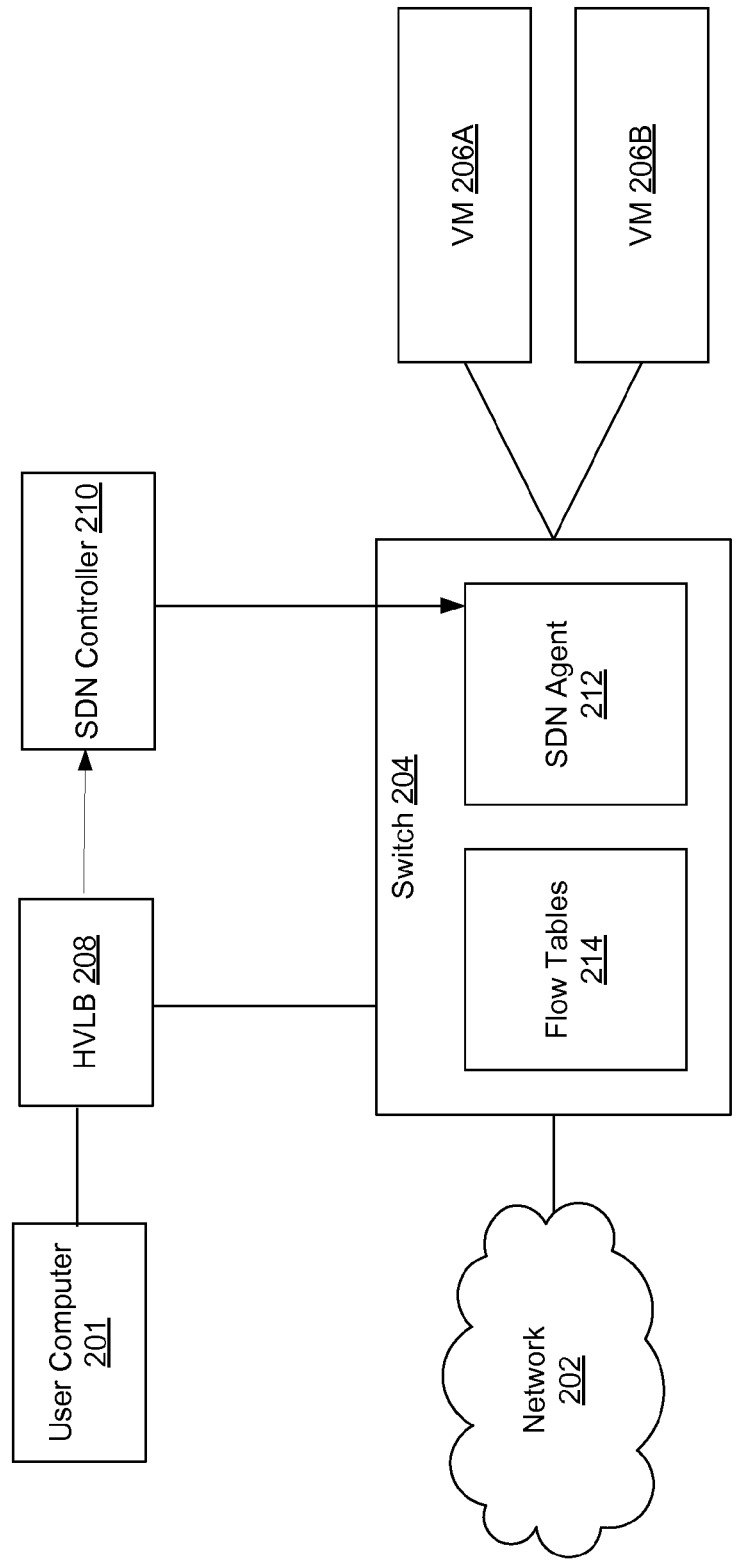
FIG. 2 is an example block diagram illustrating a network architecture system implementing a hybrid virtual load balancer, according to an example embodiment.

FIG. 2 illustrates a network architecture system 200 including user computer 201, network 202, switch 204, VMs 206, HVLB 208, and SDN controller 210, according to an example embodiment. In an embodiment, switch 204 may be connected to network 202. Network 202 may be representative of any type of network such as a wide area network (WAN), or any other networks as described with regards to network 102. Switch 204 may be coupled to HVLB 208, VMs 206, and SDN controller 210.

User computer 201 may be coupled to HVLB 208 and is representative of one or more computers operated by one or more users to control the configuration and load processing processes within network architecture system 200. A user may send policy code from user computer 201 to HVLB 208. In an embodiment, the policy code may be in a high level programming language as further described below. In an embodiment, user computer 201 may be a virtual machine or remote server operated by a user.

VMs 206 may be similar to VMs 106 and likewise be representative of virtual machine appliances or servers in a rack in a top-of-rack architecture. VMs 206 may receive and process the load balanced packets from switch 204.

Switch 204 may be a hardware networking device that is software-defined networking (SDN) compatible. In an SDN compatible switch, the data/forwarding plane may be decoupled from the control plane such that the switch does not perform functions of the control plane. In an embodiment, switch 204 may include SDN Agent 212 that configures flow table 214 for implementing the data plane of switch 204. In an embodiment, switch 204 may be a multilayer switch or any of the types of switches described with regards to switch 104, such as an OSI layer 2 switch or a content services switch.

Flow table 214 may be one or more flow tables configured in memory to store flow rules and associated actions. A flow table may be responsible for matching a flow with a forwarding or a processing action to be performed. For example, the flow table may be a lookup table used by switch 204 to select a forwarding or a processing action based on a flow received at switch 204. In an embodiment, flow table 214 may contain one or more fields as described in the OPENFLOW communications protocol and additional fields as specified by hardware of switch 204. For example, fields may include match fields, a priority field, and an instruction field.

Match fields—may include one or more of the following fields: Switch Port, MAC source, MAC destination, Ethernet type, VLAN ID, IP source, IP destination, IP Protocol, TCP source port, TCP destination port, and others fields specified within a packet. In an embodiment, switch 204 may search flow table 214 to match a flow entry with a received packet based on whether the bits of the packet match those specified by the match fields. An entry within a match field may contain a group of symbols that represents a match. In an embodiment, a "1" or "0" value may be used to match a single bit. In an embodiment, another symbol may represent a "don't care" value that matches on both a "1" and "0" value.

In an embodiment, switch 204 may be configured to match on a maximum number N of match fields e.g. an N-tuple match and/or a maximum number of flow entries due to hardware constraints of switch 204.

Priority field—may include a priority level of a flow entry e.g. whether the rule of the flow entry should be matched before another flow entry.

Counter field—may track a number of packets that match the flow entry.

Instruction field—may include one or more actions associated with the flow entry. In an embodiment, when a received packet matches the match fields, the received packet is processed according to the one or more actions. In an embodiment, actions may include one or more actions enabled by capabilities of switch 204 and that are compatible with a communications protocol, such as the OPENFLOW, for programming the flow entries. For example, actions may include:

DROP—instructing switch 204 to discard the received packet. In an embodiment, the instruction field may include zero actions, which indicates a matching received packet should be dropped.

FORWARD—instructing switch 204 to send the received packet to one or more of VMs 206, HVLBs 208, other switch(es), or other flow table(s) 204. In an embodiment, based on forward action(s) associated with flow entries, a received packet may be forwarded to one or more other flow table(s) 204 within switch 204 before being sent out of switch 204.

MODIFY—instructing switch 204 to modify the received packet. In an embodiment, switch 204 may add, set, or remove information of the received packet. For example, switch 204 may replace existing source and destination addresses of various protocols on various OSI layers included in the received packets.

In an embodiment, flow table 214 may be implemented using special hardware such as content-addressable memory (CAM) or ternary content-addressable memory (TCAM). Both a CAM and TCAM may search their respective memories to match an input in a single clock cycle. TCAM may additionally provide faster and more flexible matching capabilities because a TCAM can store a "don't care" value as well as a "1" and a "0" value as provided by CAM. Therefore, a TCAM may match an input bit with the "don't care value" and either a "1" or a "0," depending on the bit value of the input bit. By storing flow table 214 in CAM/TCAM, switch 204 may more quickly match received packets with flow entries and process the received packets according to instruction(s) associated with the flow entries. In an embodiment, packets received by switch 204 may be forwarded to one or more VMs 206 as specified by a matching entry in flow table 204, effectively load balancing data traffic as dictated by HVLB 208 via SDN controller 210. For example, switch 204 may be configured by SDN agent 212 to load balance data packets on match fields associated within any of OSI layer 2, 3, and/or 4 headers. In an embodiment, if no matches are found, received data packets may be forwarded to HVLB 208 for further processing.

Software defined networking (SDN) agent 212 may be representative of an interface for programming flow rules received from outside switch 204 into flow table 214. In an embodiment, SDN agent 212 may enable an outside entity, such as HVLB 208, to view the flow rules within flow table 214 for better network diagnosis and monitoring. The provided interface may effectively enable switch 204 to offload actions of the control plane. In an embodiment, SDN agent 212 may be software implemented as embedded firmware within switch 204.

In an embodiment, based on received control messages from SDN controller 210, SDN agent 212 may be configured to program a flow rule into one or more flow entries of flow table(s) 214. For example, SDN agent 212 may insert a flow entry into flow table 214 such that a received packet having a destination MAC address of 00:01:23:45:67:89 is to be forwarded to port6 e.g. sent to VM 206A. In this example, other available match fields of flow table 214 may be set to "don't cares" matching on a "1," "0," or "don't care" value.

SDN controller 210 may be configured to add or remove routing flow rules into flow table 214 of switch 204 by sending control messages to SDN agent 212. The control messages may be defined by and implemented using an SDN communications protocol, such as OPENFLOW. In an embodiment, SDN controller 210 may be implemented by one or more processors, each processor including one or more cores. In an embodiment, SDN controller 210 may be implemented as a network of multiple distributed SDN controllers, which may enable greater scalability. In an embodiment, SDN controller 210 may be coupled to and control one or more switch 204.

In an embodiment, SDN controller 210 may receive programming instructions from HVLB 208 and then convert the received programming instructions into control messages to send to switch 204. In an embodiment, the received programming instructions may be low level code compatible with an SDN communications protocol, such as OPENFLOW. In this embodiment, the programming instructions may be forwarded to switch 204 as control messages.

In an embodiment, HVLB 208 may detect the hardware capabilities and/or processing capacity of switch 204 to determine whether to offload data traffic to be processed at switch 204. For example, HVLB 208 may process received data packets that may need to be processed at OSI layer 7 in software if switch 204 is not capable of processing data packets at OSI layer 7. In an embodiment, capabilities and/or capacity of switch 204 may be detected periodically or initiated manually by an administrator. In an embodiment, hardware capabilities may include the number of match fields and the specific fields that switch 204 is capable of matching to direct packet flow. In an embodiment, processing capacity may include how frequently switch 204 is forwarding packets or how many entries within flow tables 214 are available for programming. Based on the number of open entries or a proportion of open entries greater than a threshold, HVLB 208 may decide to program switch 204 via SDN controller 210 to load balance data traffic. In an embodiment, the decision for whether to program switch 204 may be based on policy code received from user computer 201 operated by one or more users.

Though not depicted, HVLB 208 may be configured to monitor and control the load balancing processing of multiple switches 204. In an embodiment, by offloading load balancing functions that are compatible with software and hardware capabilities of respective switches 204, HVLB 208 may efficiently and flexibly operate in a heterogeneous environment of different generation and/or vendor switches 204. In an embodiment, as technology improves and switches 204 become more advanced and include more functionality, the control plane framework provided by HVLB 208 may not need to be completely redesigned and more load balancing processing may be offloaded to switches 204.

In an embodiment, HVLB 208 may determine to process the received data packet even when external hardware of switch 204 supports packet processing. For example, policy code may require HVLB 208 to process received data packets to enable packet capture and/or to debug the network traffic.

In an embodiment, HVLB 208 may be configured to reactively and/or proactively program switch 204 to perform the load balancing operations based on received policy code. In an embodiment, HVLB 208 is proactive when HVLB 208 sends the programming instructions to load balance a data packet to SDN controller 210 before receiving that data packet from switch 204. In an embodiment, HVLB 208 is reactive when HVLB 208 receives a data packet that cannot be load balanced on switch 204 from switch 204 before determining whether to send programming instructions to SDN controller 210. The programming instructions may subsequently be converted by SDN controller 210 into control commands to program flow rules into flow tables 214 of switch 204.

In an embodiment, HVLB 208 may receive policy code from user computer 201 and act like a compiler by converting the policy code into programming instructions to send to SDN controller 210. In an embodiment, the policy code may be in the form of a very high-level programming language (VHLL) or high-level programming language (HVL) code. For example, policy code may be written in a scripting language such as PERL or PYTHON. The compiling capabilities of HVLB 208 may enable users to use high-level languages to more productively configure networks and load balance data traffic in networks. User may only need to focus on programming policies and high-level abstractions as opposed to the minute details using lower level programming languages, which may reduce development time and error prone code.

Figure 3:
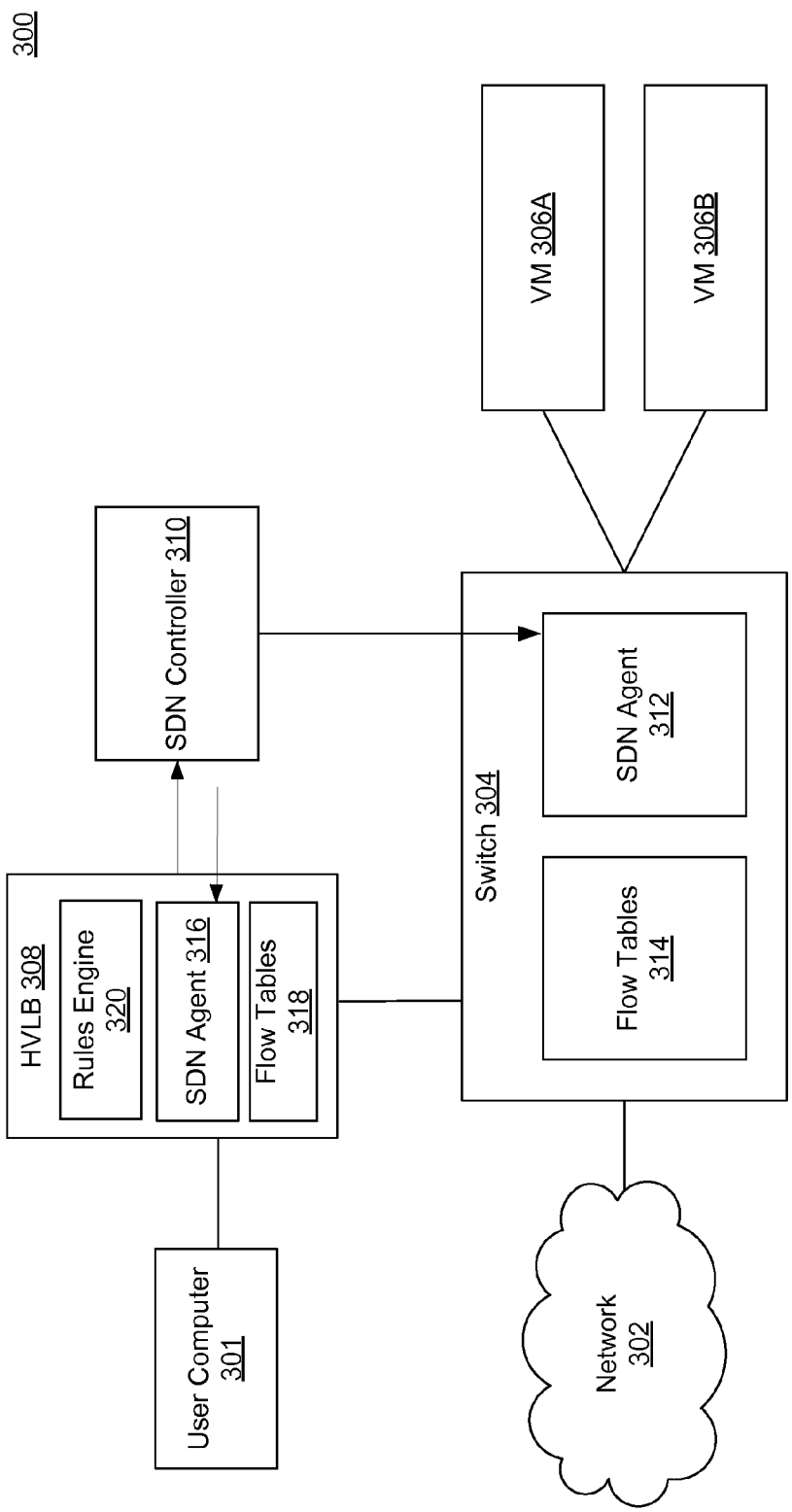
FIG. 3 is an example block diagram illustrating a network architecture system implementing a hybrid virtual load balancer configured as a softswitch, according to an example embodiment.

FIG. 3 illustrates a network architecture system 300 including user computer 301, network 302, switch 304, VMs 306, HVLB 308, and SDN controller 310, according to an example embodiment. Switch 304 may include flow tables 314 and SDN agent 312 configured to program the flow rules in flow tables 314. In an embodiment, switch 304 may be connected to network 302. Network 302 may be representative of a wide area network (WAN) or other networks and components as described with regards to network 102. Similar to the system described with regards to FIG. 2, many other depictions of the number and configuration of switches, HVLBs, and VMs are possible and may depend on best practices and the intended purpose and performance requirements of network architecture system 300.

Components within network architecture system 300 may operate in the same way as components described with respect to network architecture system 200. For example, switch 304 may receive, from network 302, a data packet that cannot be matched in flow table 314. The data packet may be forwarded to HVLB 308, which may determine whether to offload processing i.e. load balancing of that data packet to switch 304 for future data traffic. The determination whether to offload may be dictated by policy code received from user computer 301 operated by a network administrator. To offload processing, HVLB 308 may send programming instructions to SDN controller 310, which sends control messages to SDN agent 312. SDN agent 312 of switch 304 may then program the flow rules as dictated by the control messages into flow tables 314. The programmed flow rule may match on the previously received data packet and switch 304 may forward that data packet to, for example, VM 306B.

Though processing and load balancing of data traffic may be offloaded, i.e. programmed into hardware-based switch 304 to enable greater speeds provided by the hardware, the hardware may have scalability limits. For example, in stateful load balancing, a hardware-based switch 304 may be limited in the number of stateful sessions that may be supported and maintained. In an embodiment, to support offloading stateful data traffic in the middle of a session, HVLB 308 may be needed to configure switch 304. Switch 304 may also contain limited ability to rewrite and modify received packets. Therefore, HVLB 308 may be needed to modify the packets before continuing to forward data traffic within the session.

In addition to the offloading capabilities, HVLB 308 may be deployed as a software switch to address the limitations of switch 304. In an embodiment, HVLB 308 may overcome the limitations by utilizing zero-copy, user-space packet processing. In an embodiment, HVLB 308 may be implemented on one or more x86 processors that utilize, for example, the Data Plane Development Kit (DPDK) to provide the zero-copy, user-space packet processing. As a software switch implementation, HVLB 308 may be capable of performing more sophisticated packet modifications than a switch 304 that is hardware based. Therefore, in an embodiment, HVLB 308 may decide to process and load balance a data packet itself if more sophisticated packet modifications are needed instead of offloading processing and/or load balancing of the data packet to switch 304. In an embodiment, as switch 304 become less hardware based and incorporates more intelligent software, HVLB 308 may instead decide to offload processing of the data packet and/or data flow. In an embodiment, this offloading determination may be indicated by policy code a user or administrator submits to HVLB 308 via user computer 301.

HVLB 308 may also be utilized to integrate test and validation of SDN processing within network architecture system 300. In an embodiment, HVLB 308 may send test packets through switch 304 that may be validated by SDN controller 310. In such a case, the test packets may be forwarded by switch 304 to an appliance-based test/validation application to correlate and validate the data traffic. In an embodiment, HVLB 308 enables network architecture system 300 to test and validate SDN behavior in-service.

In an embodiment, HVLB 308 may be deployed as a softswitch that contains flow tables 318 and SDN agent 316, which operates similar to SDN agent 312 within switch 304. A softswitch may be a computer network device that includes software application programs that expands upon the load balancing capabilities of a physical switch, such as switch 304. A softswitch deployed HVLB 308 further provides a communication interface to control or communicate with VMs 306, switch 306, or SDN controller 310. For example, HVLB 308 implemented as a softswitch may send programming requests to SDN controller 310. In addition to the capability to request SDN controller 310 to control switch 304 to program flow rules into flow tables 314, HVLB 308 may receive control messages that SDN controller 310 sends to SDN agent 312 via SDN agent 316. In an embodiment, SDN agent 316 may set up flow rules within flow tables 318 of HVLB 308 using the same control messages that SDN agent 312 receives to set up flow rules within flow tables 314 on switch 304. In an embodiment, software implemented flow tables 318 may be representative of the data structure of flow tables 314, but may not be implemented using high-performance hardware such as TCAMs used to implement flow tables 314. In an embodiment where HVLB 308 maintains SDN agent 316 and flow tables 318, HVLB 308 deployed as a softswitch may be capable of performing load balancing functions similar to that of hardware-based switch 304.

As discussed above, HVLB 308 (as well as HVLB 208 and HVLB 108) integrates well within an SDN environment. In an embodiment, HVLB 308 deployed as a softswitch may include a flexible rules engine 320 capable of expanding upon the actions and capabilities provided by a communications protocol, such as OPENFLOW, supported by switch 304. The flexible rules engine may be a separate component within HVLB 308. In an embodiment, the flexible rules engine may be incorporated within SDN agent 316.

In an embodiment, rules engine 320 may receive policy code in the form of one or more scripts from user computer 301. Rules engine 320 may program the flow rules associated with the one or more scripts within flow tables 318. In an embodiment, an action programmed into an entry of flow tables 318 may be to forward a matching packet to another flow table 318 or to forward to a specific script for further processing. In an embodiment, HVLB 318 may send a matching packet to a packet buffer to send to an external script for further processing. The forwarding capabilities of rules engine 320 may effectively enable chaining custom and/or default scripts to process received packets that match a flow entry within flow tables 318. Due to the flexibility provided by rules engine 320 and its capability of processing custom scripts, HVLB 308 may supplement and expand upon the capabilities provided by current protocols used with switch 304.

In an embodiment, based on policy code received from user computer 301, rules engine 320 enables HVLB 308 deployed as a softswitch to support functionality not existing in switch 304 such as HTTP packet processing, IP fragmentation and reassembly, TCP splicing, and TCP proxy functions. In an embodiment, rules engine 320 may load balancing using complex application protocols, such as GTP and Diameter protocols.

In an embodiment, rules engine 320 may interact with customized scripts and operate in a software plug-in framework/architecture for supporting new protocols and functions. With the capability to interact with software plugins, users may easily and quickly update HVLB 308 to load balance based on the latest protocols without costly redesigning of hardware or software of various components within network architecture system 300.

In an embodiment, rules engine 320 may provide the following example actions to provide a flexible interface for application load balancing, which may be transparent:

DROP—instructing HVLB 308 to discard the received packet.

LOG—instructing HVLB 308 to log the received packet. In an embodiment, the log action may be used to test and validate the network framework implementing SDN processing.

SEND TO SCRIPT—instructing HVLB 308 to send the packet to one or more scripts for further processing. As discussed above, the script may be a script received by and internal to HVLB 308 or a script external to HVLB 308.

SEND TO LB GROUP—instructing HVLB 308 to load balance data traffic by sending the packet to a set of servers or VMs 306 in a specified group. For example, VM306A-B may constitute a load balancing (LB) group. In an embodiment, SEND TO SERVER—instructing HVLB 308 to load balance data traffic by sending the packet to a specific server for further load balancing based on, for example, a specified IP address identified within the packet.

SEND TO PORT—instructing HVLB 308 to bypass load balancing decisions and send the packet to a specified port of HVLB 308. In an embodiment, HVLB 304 may be coupled to one or more VMs 306 and a specified port may be, for example, VM 306B.

FORWARD—instructing HVLB 308 to send the packet to one or more of VMs 306, switches including switch 304, or flow tables 318. For transparent load balancing, HVLB 308 may forward the packet unmodified.

REASSEMBLE—instructing HVLB 308 to send the packet for IP reassembly.

Though not depicted in FIG. 3, in an embodiment, HVLB 308 may be configured by multiple entities such as one or more user computers 301 or one or more SDN controllers 310. In an embodiment, the configuration may be enabled via policy code received from the multiple entities.

Figure 4:
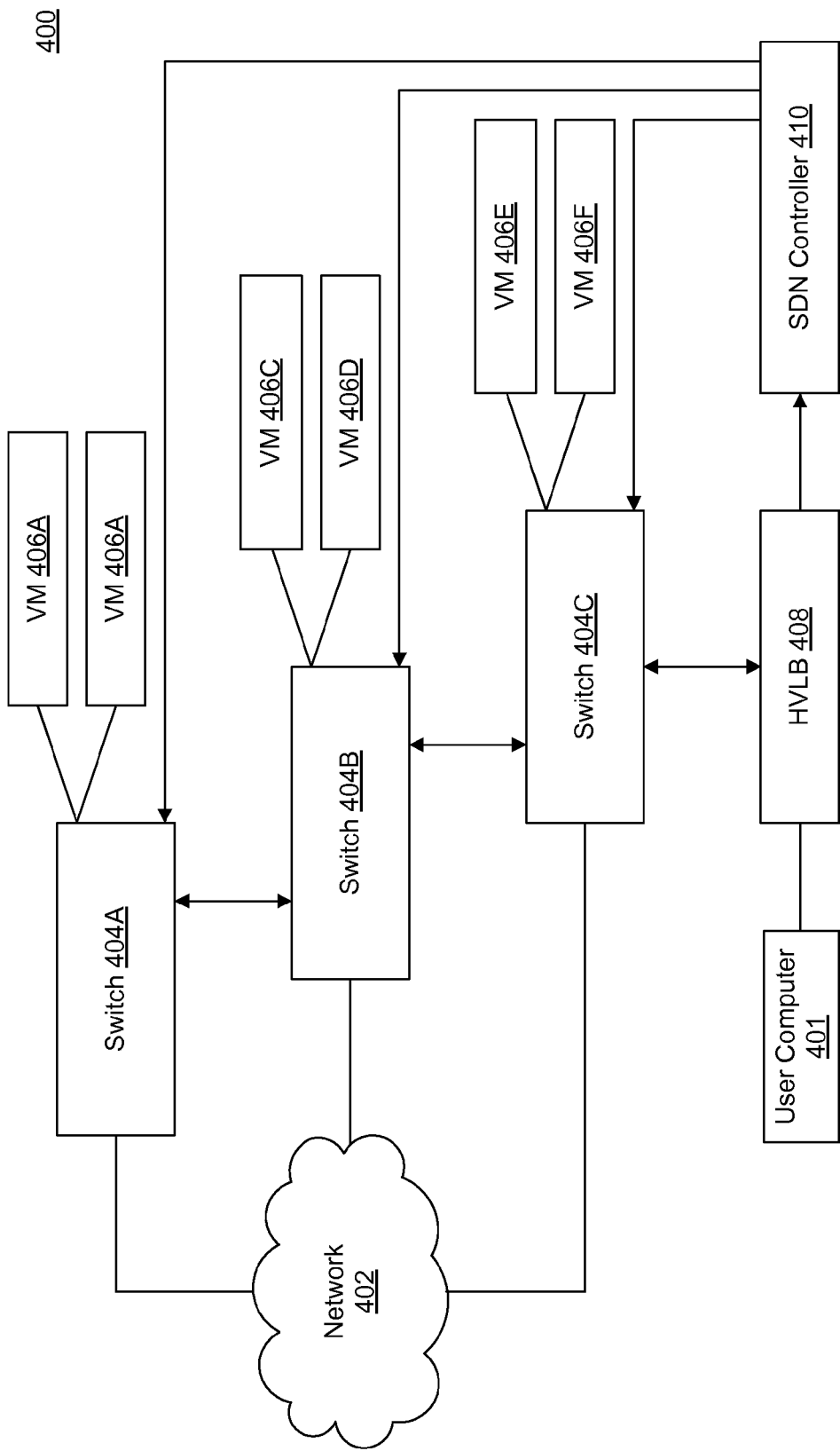
FIG. 4 is an example block diagram illustrating a network architecture system implementing a hybrid virtual load balancer in a distributed environment, according to an example embodiment.

FIG. 4 illustrates a network architecture system 400 including user computer 401, network 402, switches 404, VMs 406, HVLB 408, and SDN controller 410, according to an example embodiment. In network architecture system 400, network 402 may be connected to switches 404, each of which may be couples to one or more VMs 406. A switch 404 may be connected to one or more other switches 404. Though not depicted, in an embodiment, HVLB 408 may be coupled to one or more switches 404. Many other depictions of the number and configuration of switches, HVLBs, and VMs are possible and may depend on best practices and the intended purpose and performance requirements of network architecture system 400.

Components within network architecture system 400 may also operate in the same way as components described with respect to network architecture system 300. For example, HVLB 408 may proactively program flow rules within a flow table of switch 404C via SDN controller 410. Consequently, when switch 404C receive, from network 402, a data packet that matches a previously programmed flow entry in flow table 314, the data packet may be forwarded to, for example, HVLB 408 and/or one or more of VM 406 for further load balance processing.

In an embodiment, as depicted in FIG. 4, applications operating on VMs 406 may be distributed across two or more VMs, such as VMs 406A-F. As depicted, VMs 406 may be connected to more than one switch 404. In an embodiment, to load balance data traffic from/to an application distributed across many VMs 406, multiple switches 404 may need to be configured and programmed in a coordinated and synchronized fashion.

In an embodiment, HVLB 408 may send programming instructions to SDN controller 410 that subsequently sends control messages to many switches 404. In an embodiment, the control messages may be modified to coordinate the load balancing of data traffic at the switches 404. In an embodiment, the programming instructions from HVLB 408 may contain information enabling SDN controller 410 to determine the specific switches 404 that may need to be programmed together. In an embodiment, the SDN controller 410 may program the switches 404 that SDN controller 410 is configured to control.

For example, HVLB 408 may reactively and/or proactively configure a flow rule within the flow tables of switches 404A-C via SDN controller 410 to forward data traffic that match a set of match fields to VM 406A. If a data packet that satisfies the flow rule is received by switch 404C, that data packet may be forwarded to switch 404B because switch 404C is not coupled to VM 406A. If a data packet that satisfies the flow rule is received by switch 404B, that data packet may be forwarded to switch 404A because switch 404B is not coupled to VM 406A. Finally, if a data packet that satisfies the flow rule is received by switch 404A, that data packet may be forwarded to VM 406A because switch 404A is not coupled to VM 406A.

Figure 5:
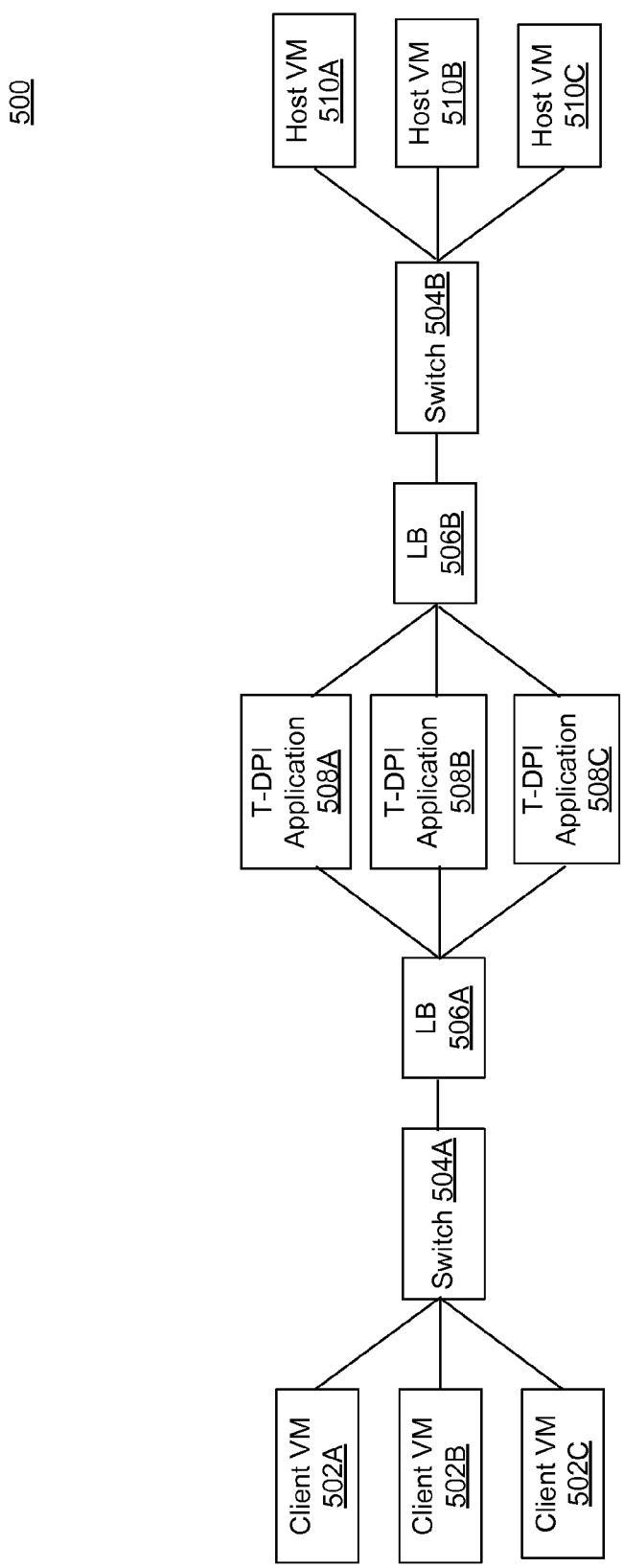
FIG. 5 is an example block diagram illustrating a network architecture system implementing transparent load balancing, according to an example embodiment.

FIG. 5 illustrates a network architecture system 500 for performing transparent load balancing that does not use a transparent virtual load balancer (VLB). Network architecture system 500 may include client VMs 502, switches 504, load balancers (LB) 506, transparent deep packet inspection appliances (T-DPI) 508, and host VMs 510. In an embodiment, client VMs 502 and host VMs 510 may be representative of servers, virtual appliances operating on one or more servers, or as described with respect to VMs 106. In an embodiment, switch 504 may be configured to forward data to and from one or more coupled VMs to one or more load balancers to perform transparent DPI. For example, switch 504A may be configured to forward data packets from client VMs 502A-C to LB 506A to be further processed. Many other depictions of the number and configuration of the listed components are possible and may depend on best practices and the intended purpose and performance requirements of network architecture system 500.

In an embodiment, LB 506 may be a hardware based transparent load balancer that may load balance data packets without changing the IP addresses of client VMs 502 and host VMs 510. In an embodiment, LB 506 may also perform functions such as deep packet inspection (DPI) and firewall.

As data traffic increases, LB 506 may provide enough capacity and processing power to load balance data transparently. In an embodiment, appliance-based T-DPI applications 508 may need to be added to scale network architecture system 500. In an embodiment, T-DPI application 508 may be implemented on a separate hardware devices with firmware designed to provide DPI capabilities. Further LBs 506, such as LB 506B may be needed to load balance data traffic among T-DPI applications 508.

Figure 6:
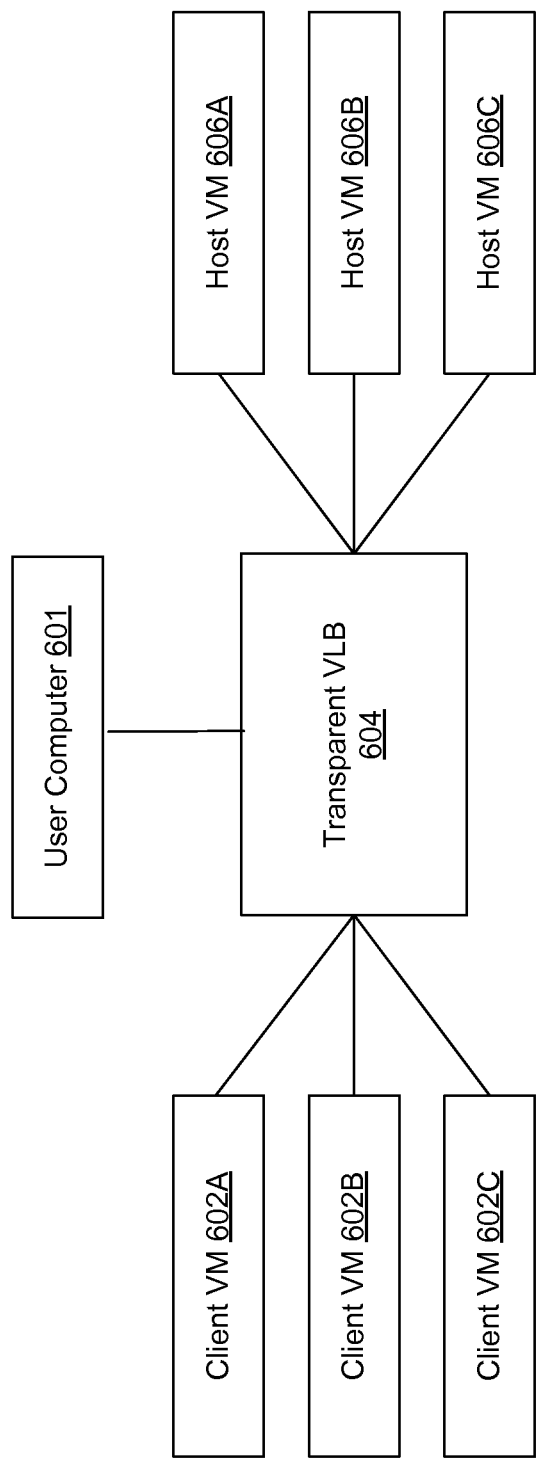
FIG. 6 is an example block diagram illustrating a network architecture system implementing transparent load balancing with a transparent virtual load balancer, according to an example embodiment.

FIG. 6 illustrates a network architecture system 600 for performing transparent load balancing that includes a transparent virtual load balancer (VLB) 604, which may vastly simplify the management of transparent load balancing as depicted in FIG. 5. Network architecture system 600 may include user computer 601, client VMs 602, transparent virtual load balancers (VLB) 604, and host VMs 606. Many other depictions of the number and configuration of the listed components are possible and may depend on best practices and the intended purpose and performance requirements of network architecture system 500.

User computer 601 may be coupled to transparent VLB 604 and is representative of one or more computers operated by one or more users to control the configuration and transparent load processing processes within network architecture system 600. In an embodiment, the control plane of transparent VLB 604 may be configured by policy code sent from user computer 601 to transparent VLB 604. In an embodiment, user computer 101 may be a virtual machine or remote server operated by a user.

Transparent VLB 604 may be similar to HVLB 108 as described above. In an embodiment, transparent VLB 604 may be cloud-based software used to transparently load balance data traffic from client VMs 602 to host VMs 606, and vice versa. HVLB 604 may be implemented on commercial off-the-shelf (COTS) servers and/or processors. In an embodiment transparent VLB 604 may be representative of a hierarchy of distributed transparent VLBs. In an embodiment, transparent VLB 604 may be deployed as a softswitch as described with regards to HVLB 308 and renders switches 504 depicted in FIG. 5 redundant and unnecessary. Semantically, transparent VLB 604 may no longer be a hybrid virtual load balancer because transparent VLB 604 may switch and load balance data traffic without determining whether to offload functionality to other hardware-based device such as switches 504. But, a hybrid virtual load balancer may still be used to perform the transparent load balancing. By deploying transparent VLBs 604, management of network architecture system 600 becomes much simpler and easier to manage due to a reduced number of devices and appliances to manage.

Figure 7:
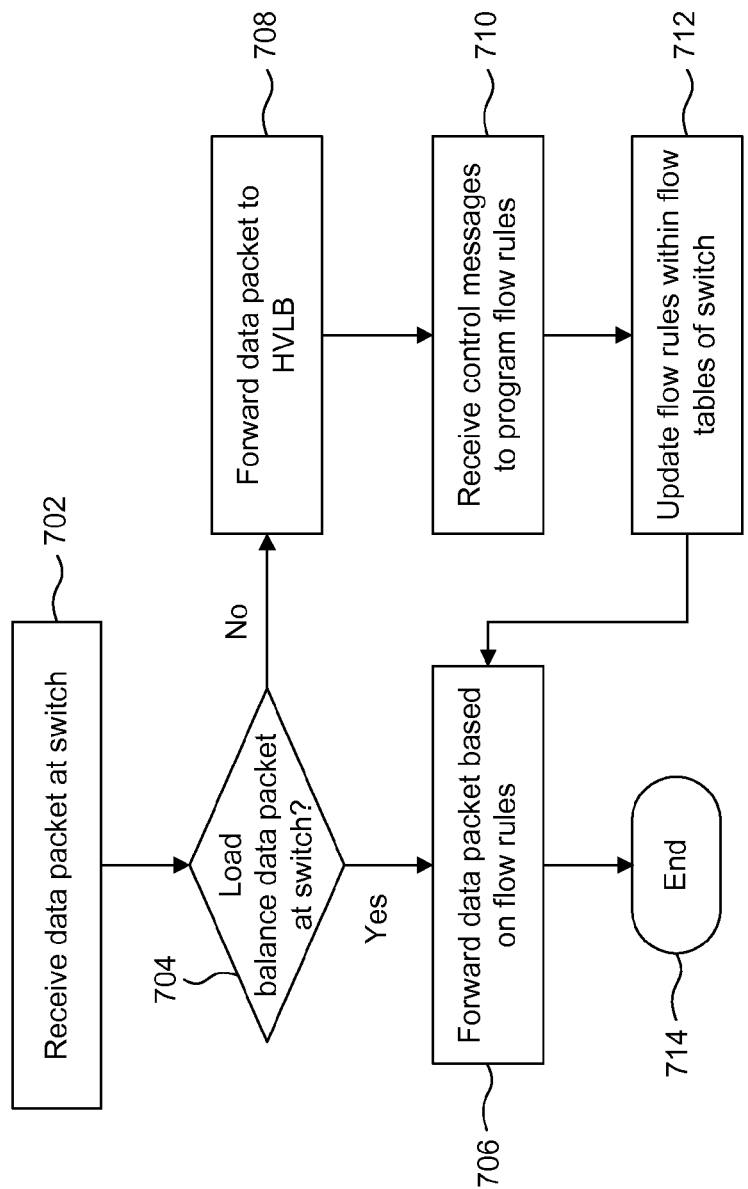
FIG. 7 is a flowchart illustrating a process for load balancing data traffic using a switch, according to an example embodiment.

FIG. 7 is a flowchart illustrating steps for performing load balancing of data traffic on a switch in a network architecture system, for example network architecture system 300 as described with regards to FIG. 3, according to an example embodiment. As described above, the switch may be a hardware-based switch that SDN compatible. In an embodiment, method 700 may also illustrate steps performed by switches described with regards to FIGS. 1-4. Method 700 can be performed by processing logic that may comprise hardware (e.g., circuitry, dedicated logic, programmable logic, microcode, etc.), software (e.g., instructions run on a processing device), or a combination thereof.

In step 702, a data packet from a network, such as network 302 of FIG. 3, may be received at a switch, such as switch 302 of FIG. 3. The switch may track a flow/session associated with the data packet for performing stateful load balancing.

In step 704, the switch may be configured to match the received data packet against match fields of flow entries within flow tables of the switch, for example flow tables 314 of switch 304 of FIG. 3, to determine whether to load balance the data packet at the switch. In an embodiment, a header and/or contents of the data packet may be matched. In an embodiment, if more than one matching flow entry is selected, priorities associated with respect selected matching flow entries may be used to determine which flow entry and associated flow rule should be used for load balancing. Upon selecting a flow entry, method 700 may proceed to step 706. In an embodiment, if no flow entries match the data packet, method 700 may proceed to step 708.

In step 706, the switch may be configured to forward the data packet according to a forwarding action associated with the selected flow entry. For example, the forwarding action may instruct the switch to send the received data packet to a specific port associated with a virtual machine, such as VM 306A from FIG. 3. In an embodiment, the forwarding action may instruct the switch to send the received data packet to an HVLB, such as HVLB 308 from FIG. 3, although a matching flow entry was found. In this embodiment, method 700 may instead proceed to step 708. Other possible actions are described with respect to FIGS. 2-4.

In step 708, the switch may be configured to forward the data packet to the HVLB for load balancing or further processing as described with respect to FIGS. 2-4. For example, the HVLB may determine to offload load balancing of the data packet to the switch and send programming instructions to an SDN controller for interfacing with the switch, such as SDN controller 310 of FIG. 3. In an embodiment, the SDN controller may translate the received programming instructions into control messages that comport with an SDN communications protocol, such as OPENFLOW, operating within the switch. Then, the SDN controller may send the control messages to the switch.

In step 710, an SDN agent of the switch, such as SDN agent 312 of switch 304, may be configured to receive control messages that indicate whether and/or how to update flow entries in flow tables within the switch. In an embodiment, the control messages may be received from the SDN controller, which translated programming instructions received from the HVLB. In an embodiment, the control messages may be received from an HVLB having the capability of translating policy code received at the HVLB into the control messages sent to the switch.

In step 712, the SDN agent of the switch may be configured to update the flow entries and associated flow rules within the flow tables of the switch according to the received control messages. In an embodiment, a data packet that could not be matched in step 704 may now be matched to one or more of the updated flow entries.

Figure 8:
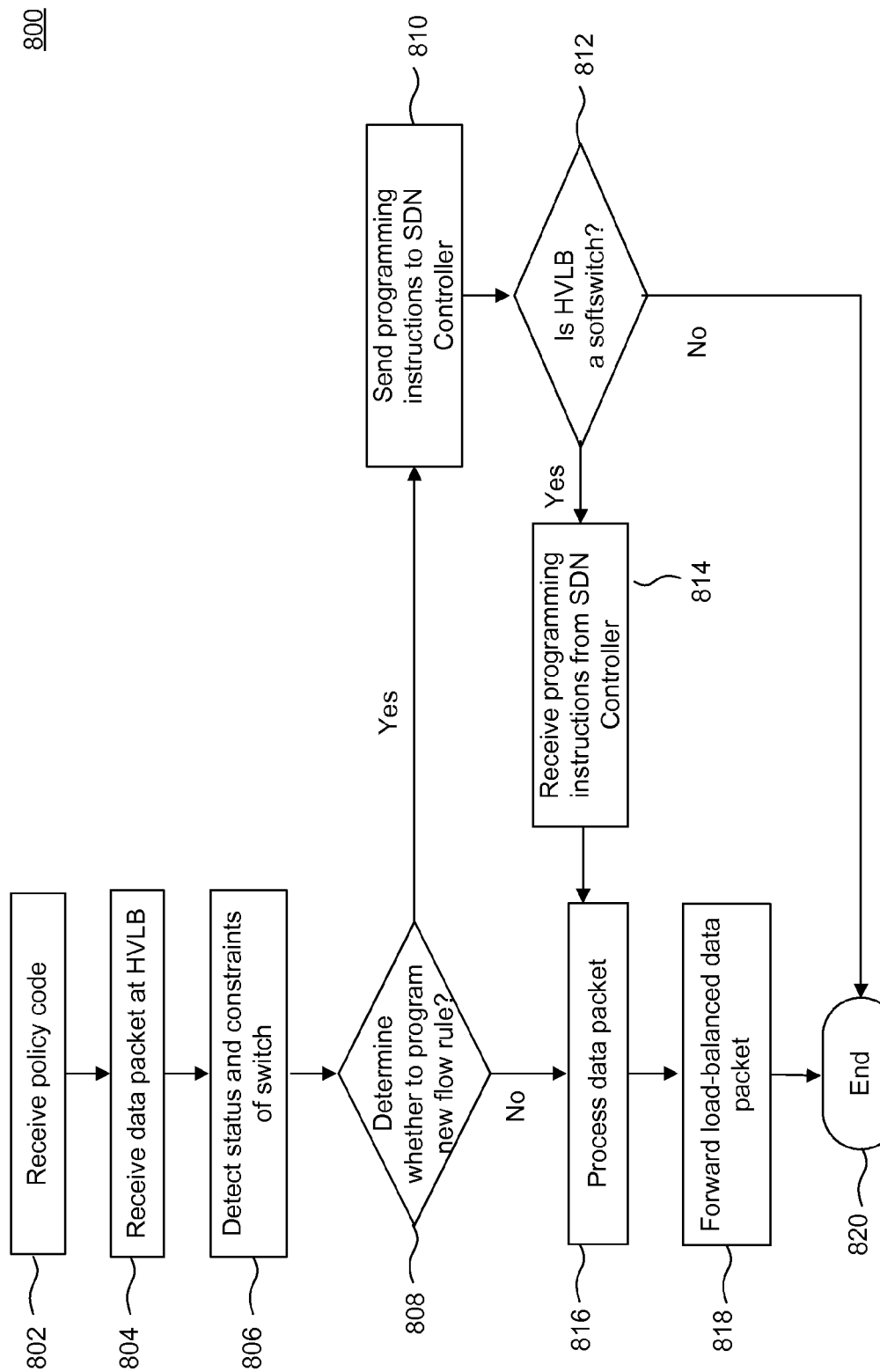
FIG. 8 is a flowchart illustrating a process for load balancing data traffic using a hybrid virtual load balancer, according to an example embodiment.

FIG. 8 is a flowchart illustrating steps for performing load balancing of data traffic by an HVLB in a network architecture system, for example network architecture system 300 as described with regards to FIG. 3, according to an example embodiment. As described above, the HVLB may be implemented in software on a COTS server and complement and/or extend SDN functionally of the network architecture system. In an embodiment, the HVLB may be deployed as a softswitch. In an embodiment, method 800 may also illustrate steps performed by HVLBs described with regards to FIGS. 1-4. Method 800 can be performed by processing logic that may comprise hardware (e.g., circuitry, dedicated logic, programmable logic, microcode, etc.), software (e.g., instructions run on a processing device), or a combination thereof. In an embodiment, the steps of method 800 may be performed in a different order. For example, steps 802-806 may be interchangeably performed.

In step 802, policy code from a client, such as user computer 301, may be received by a rules engine of an HVLB, for example rules engine 320 of HVLB 308 in FIG. 3. In an embodiment, the policy code may be written in a high level language that specifies the desired load balancing behavior of the switches, such as one or more of switch 304 in network architecture system 300 of FIG. 3. In an embodiment, policy code may consist of one or more chainable scripts as described with regards to FIGS. 1-4. In an embodiment, the policy code may specify that the HVLB reprogram load balancing behavior in the middle of a data flow/session. Therefore, data packets within a data flow may be load balanced differently.

In step 804, the HVLB may be configured to receive a data packet to be load balanced from a switch, such as switch 304 of FIG. 3. In an embodiment, the HVLB may receive the data packet directly from the network, such as network 302 in FIG. 3.

In step 806, the HVLB may be configured to detect statuses and/or constraints of the switch. In an embodiment, constraints may include hardware capabilities of the switch such as which OSI layer information may be matched for load balancing or a memory capacity of flow tables within the switch. In an embodiment, statuses of the switch may include a data traffic processing load or remaining flow entries in the flow tables that do not contain programmed flow rules.

In step 808, the HVLB may be configured to determine whether to load balance the data packet in software of the HVLB or to program one or more flow rules within the flow tables of the switch to offload load balancing to the switch. In an embodiment, the HVLB may make the determination based on received policy code and detected statuses and constraints of the switch. In an embodiment, the detected statuses and/or constraints may be prioritized over the policy code unless otherwise specified by the policy code. In an embodiment, the rules engine may perform the receiving and determination.

In step 810, the HVLB may be configured to send programming instructions to an SDN controller, such as SDN controller 310 of FIG. 3, that indicates which flow rules should be programmed into the flow tables of the switch. In an embodiment, the rules engine may translate the policy code written in a higher level language into programming instructions that the SDN controller may be configured to process. Such programming instructions may likely be code in a lower level language.

In step 812, if the HVLB is not a softswitch, method 800 may proceed to step 820. In an embodiment, the rules engine may be capable of translating the policy code into control messages sent to an SDN agent of the switch, for example SDN agent 312 of switch 304, whether or not the HVLB is a softswitch. In an embodiment, the HVLB being deployed as a softswitch may include its own SDN agent and flow tables, such as SDN agent 316 and flow tables 318, respectively.

In step 814, the SDN agent of the HVLB may be configured to receive programming instructions from the SDN controller although the programming instructions may be intended for the switch. In an embodiment, the SDN agent of the HVLB may be a component within the rules engine of the HVLB. Based on the received programming instructions or in conjunction with the rules engine, the SDN agent of the HVLB may program flow rules into the flow tables of the HVLB.

In step 816, the HVLB may be configured to process the data packet according to policy code and associated scripts or according to flow rules programmed into the flow tables of the HVLB.

In step 818, the HVLB may be configured to forward the load-balanced data packet according to actions associated with a selected flow rule. In an embodiment, if the HVLB is deployed as a softswitch, the data packet may be forwarded to a virtual port of the HVLB that indicates a specific virtual machine, such as VM 306A of FIG. 3.

Figure 9:
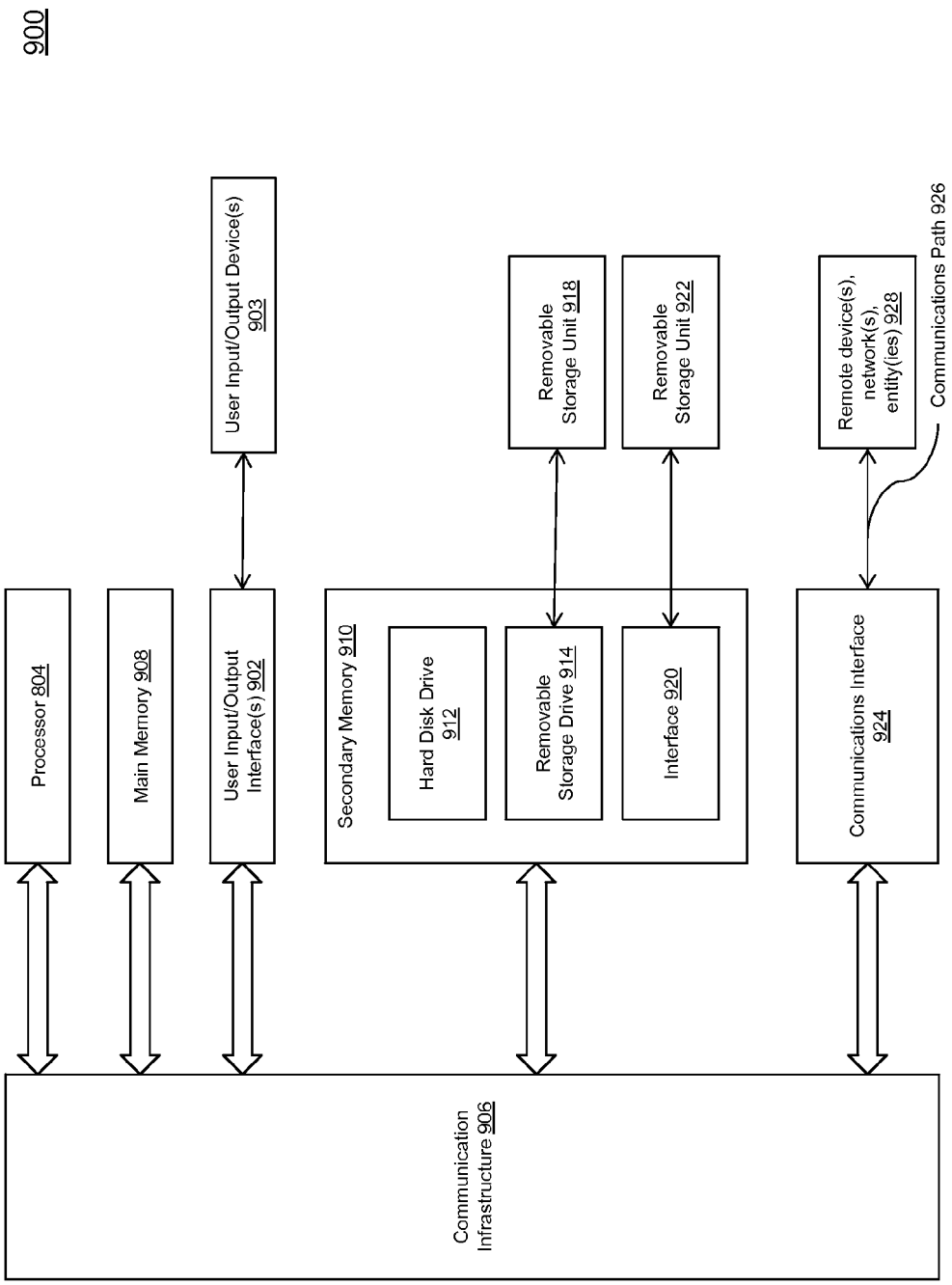
FIG. 9 is an example computer system useful for implementing various embodiments.

Various embodiments can be implemented, for example, using one or more well-known computer systems, such as computer system 900 shown in FIG. 9. For example, the HVLBs, switches, SDN controllers, and VMs described above may be implemented as computer system 900. In an embodiment, a hardware-based switch may contain specialized hardware such as CAM and/or TCAM as discussed above and not depicted in computer system 900. Computer system 900 may be any well-known computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In an embodiment, a tangible apparatus or article of manufacture comprising a tangible computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 9. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A system, comprising:
  a computing device; and
  a hybrid virtual load balancer (HVLB), implemented on the computing device and coupled to a switch that supports a software defined networking (SDN) communications protocol, configured to:
    detect a hardware capability of the switch;
    receive a data packet from the switch;
    determine whether to offload load balancing of the data packet to the switch based on the detected hardware capability; and
    send, in response to determining to offload load balancing, programming instructions to an SDN controller coupled to the switch, wherein the programming instructions direct the SDN controller to program the switch to load balance the data packet through control messages that comport with the SDN communications protocol.

2. The system of claim 1, wherein the HVLB is further configured to:
  detect a processing load of the switch; and
  determine whether to offload load balancing of the data packet to the switch based on the detected hardware capability and processing capacity.

3. The system of claim 1, wherein the HVLB is further configured to:
  receive a policy code from a user, wherein the policy code comprises user-customized load balancing behavior that augments a functionality provided by the SDN communications protocol; and
  determine whether to offload load balancing of the data packet based on the detected hardware capability and the policy code.

4. The system of claim 1, wherein the HVLB is further configured to:
  receive a software plug-in comprising a different SDN communication protocol or a functionality different from or in addition to that provided by the SDN communications protocol;
  determine whether to offload load balancing of the data packet based on a load balancing behavior specified within the software plug-in; and
  send programming instructions to the SDN controller or the switch based on the determination.

5. The system of claim 1, wherein the HVLB is further configured to:
  send a test data packet that originated on the HVLB to the switch, wherein the test data packet is used to validate an SDN functionality of the switch and the SDN controller.

6. The system of claim 1, wherein the HVLB is further configured to:
  send new programming instructions to the SDN controller configured to program the switch in the middle of a network session to perform stateful load balancing, wherein data packets in the network session that are received after the programming are load balanced according to the new programming instructions.

7. The system of claim 1, wherein the HVLB is deployed as a softswitch and further configured to:
  communicate with the SDN controller to perform load balancing in software at the HVLB instead of in hardware on the switch.

8. The system of claim 7, wherein the HVLB comprises a plurality of hierarchically distributed HVLBs and is further configured to:
  enable the plurality of hierarchically distributed HVLBs to be configured by a user as a single load balancer;
  perform transparent load balancing of the data packet in software on the HVLB based on the configuration of the single load balancer; and
  send the data packet to a server without using the switch.

9. The system of claim 7, wherein the HVLB is further configured to:
  integrate zero-copy, user-space packet processing in order to support load balancing for a larger number of network sessions than that provided by the switch.

10. A method, comprising:
  detecting, by a hybrid virtual load balancer (HVLB) that is implemented on a computing device, a hardware capability of a switch that is coupled to the HVLB and that supports a software defined networking (SDN) communications protocol;
  receiving a data packet from the switch;
  determining whether to offload load balancing of the data packet to the switch based on the detected hardware capability; and
  sending, in response to determining to offload load balancing, programming instructions to an SDN controller coupled to the switch, wherein the programming instructions direct the SDN controller to program the switch to load balance the data packet through control messages that comport with the SDN communications protocol.

11. The method of claim 10, further comprising:
  detecting a processing load of the switch; and
  determining whether to offload load balancing of the data packet to the switch based on the detected hardware capability and processing capacity.

12. The method of claim 10, further comprising:
  receiving a policy code from a user, wherein the policy code comprises user-customized load balancing behavior that augments a functionality provided by the SDN communications protocol; and
  determining whether to offload load balancing of the data packet based on the detected hardware capability and the policy code.

13. The method of claim 10, further comprising:
  receiving a software plug-in comprising a different SDN communication protocol or a functionality different from or in addition to that provided by the SDN communications protocol;
  determining whether to offload load balancing of the data packet based on a load balancing behavior specified within the software plug-in; and
  sending programming instructions to the SDN controller or the switch based on the determination.

14. The method of claim 10, further comprising:
  sending a test data packet that originated on the HVLB to the switch, wherein the test data packet is used to validate an SDN functionality of the switch and the SDN controller.

15. The method of claim 10, further comprising:
  sending new programming instructions to the SDN controller configured to program the switch in the middle of a network session to perform stateful load balancing, wherein data packets in the network session that are received after the programming are load balanced according to the new programming instructions.

16. The method of claim 10, wherein the HVLB is deployed as a softswitch, the method further comprising:
  communicating with the SDN controller to perform load balancing in software at the HVLB instead of in hardware on the switch.

17. The method of claim 16, wherein the HVLB comprises a plurality of hierarchically distributed HVLBs, the method further comprising:
  enabling the plurality of hierarchically distributed HVLBs to be configured by a user as a single load balancer;
  performing transparent load balancing of the data packet in software on the HVLB based on the configuration of the single load balancer; and
  sending the data packet to a server without using the switch.

18. The method of claim 16, further comprising:
  integrating zero-copy, user-space packet processing in order to support load balancing for a larger number of network sessions than that provided by the switch.

19. A non-transitory computer readable storage medium having instructions stored thereon that, in response to execution by a computing device, cause the computing device to perform operations for performing load balancing of a data packet, the operations comprising:
  detecting, by a hybrid virtual load balancer (HVLB) that is implemented on the computing device, a hardware capability of a switch that is coupled to the HVLB and that supports a software defined networking (SDN) communications protocol;
  receiving the data packet from the switch;
  determining whether to offload load balancing of the data packet to the switch based on the detected hardware capability; and
  sending, in response to determining to offload load balancing, programming instructions to an SDN controller coupled to the switch, wherein the programming instructions direct the SDN controller to program the switch to load balance the data packet through control messages that comport with the SDN communications protocol.

20. The non-transitory computer readable storage medium of claim 19, wherein the operations further comprise:
  receiving a policy code from a user, wherein the policy code comprises user-customized load balancing behavior that augments a functionality provided by the SDN communications protocol; and
  determining whether to offload load balancing of the data packet based on the detected hardware capability and the policy code.

* * * * *